M. LEVRANT.
AIR TIGHT VALVE FOR PNEUMATIC TIRES.
APPLICATION FILED DEC. 3, 1910.
999,506.
Patented Aug. 1, 1911.
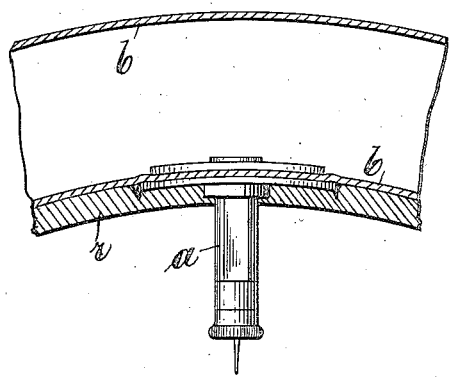
 
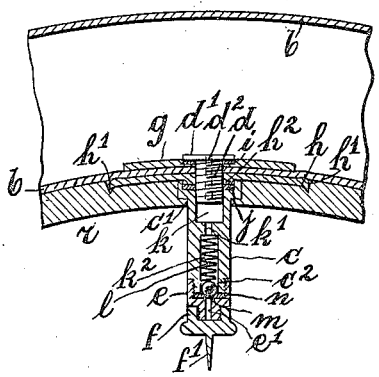 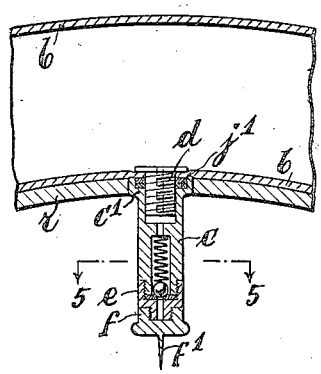
 
Witnesses:
Max B. A. Doring
Corinne Myers.
Inventor
Morris Levrant
By his Attorney
L. K. Bohm.

UNITED STATES PATENT OFFICE.

MORRIS LEVRANT, OF NEW YORK, N. Y.

AIR-TIGHT VALVE FOR PNEUMATIC TIRES.

999,506.  Specification of Letters Patent.  Patented Aug. 1, 1911.

Application filed December 3, 1910. Serial No. 595,360.

*To all whom it may concern:*

Be it known that I, MORRIS LEVRANT, a citizen of the Empire of Russia, and a resident of Brooklyn, city of New York, county of Kings, State of New York, have invented certain new and useful Improvements in Air-Tight Valves for Pneumatic Tires, of which the following is a specification.

This invention relates to a novel air-tight valve for pneumatic tires and pertains particularly to air-tight valves that may be used even if the valve opening in the tire has been enlarged by wear and tear or was rendered untight by cracks in the rubber around the opening. Furthermore the necessary threaded portions of the valve are so disposed that leakage along the threads is rendered impossible, while heretofore such valves with threaded parts extending to the atmosphere were found in the market.

The present invention has for its object to produce an air-tight valve for pneumatic tires in which the mentioned deficiencies are avoided and which is free from such threaded portions that may form a passage for air around the threads and accordingly forms an absolutely tight closure. A lateral dislocation of the valve likewise is rendered impossible and care has been taken to produce a neat and durable article, all as will be fully described hereinafter with reference to the accompanying drawings in which:

Figure 1 represents in side elevation an air-tight valve for pneumatic tires embodying in desirable form the present improvements and applied to a pneumatic tire which is shown in section. Fig. 2 is a vertical central section through the device. Fig. 3 is a vertical central section of a somewhat modified form of the device. Fig. 4 is a top plan view of the air-tight valve, and Fig. 5 is a cross section on line 5—5 of Fig. 3.

Similar characters of reference denote like parts in all the figures.

In the drawing $a$ represents the air-tight valve, $b$ is the pneumatic tire and $r$ the wooden rim in which the tire is located. The novel air-tight valve consists essentially of a tubular part $c$ which is provided with a flange $c^1$ on one end portion and threaded on the inside so as to render it adapted to receive the screw $d$. The other end portion of the tubular part $c$ is reduced and also provided with a thread on this reduced portion $c^2$. A short intermediary tubular part $e$, threaded on one end portion on the inside fits the reduced portion $c^2$ of the part $c$. The other end portion of the part $e$ is reduced and threaded on the outside so as to be adapted to receive the cap $f$ which is threaded on the inside. The parts $c$, $e$ and the adjoining portion of the cap $f$ are preferably of the same diameter and outside flush with each other. The screw $d$ fitting into the tubular part $c$ has a thin flat head $d^1$ which is preferably of circular shape. An oblong flange $g$ is located on the threaded portion of the screw $d$ and a second oblong flange $h$ is also located thereon. When the valve is applied the flange $g$ is within the pneumatic tire while the flange $h$ is outside of same. This latter flange $h$ is provided with two outward end points $h^1$ which are forced into the inner portion of the wooden rim $r$ whereby any lateral dislocation of the device is prevented when it is applied to a tire and the tire pumped up. This flange $h$ further has an inner rim $h^2$ for a purpose to be explained farther down.

The screw $d$ is hollow and its flat circular head $d^1$ has a small opening $d^2$ in the center as shown in Figs. 2, 3 and 4. The opening $d^2$ communicates with the interior of the tire. Between the head $d^1$ of the screw $d$ and the flange $g$ there is a tightening washer $i$. A similar washer $j$ is located on the screw $d$ between the flange $c^1$ of the part $c$ and the large oblong flange $h$ as shown in Fig. 2. The tubular part $c$ has an interior opening which near the screw $d$ form a wide portion $k$ and then a relatively very narrow portion $k^1$ and again a wider portion $k^2$ which extends to the end of same. The space $k^2$ is purposed to house a spring $l$ which rests against the shoulder on the narrow opening $k^1$ and extends to the end of said part $c$. The short part $e$ has one end portion so wide that it may receive the threaded end portion $c^2$ of the part $c$ and a narrow channel $e^1$ extending through the rest of said part. A washer $n$ of leather, rubber or the like with small central opening above the bore $e^1$ rests against the shoulder on said bore and at the end of the spring $l$ there is a small ball $m$ which is pressed against the washer by the spring. The cap $f$ further is provided with a sharp point $f^1$ whose purpose will be explained farther down.

Assuming now that, for instance, the valve opening in the tire is somewhat enlarged then the insertion of the air-tight valve is effected in substantially the following manner: First the screw head $d^1$ and the oblong flange $g$ are passed through the valve opening in the tire, then the threaded part $c$ is tightly screwed on the screw $d$ so as to press the tire firmly between the flanges $g$ and $h$. The cap $f$ is now screwed off and its point $f^1$ passed through the narrow bore $e^1$ of the part $e$ for the purpose of loosening the ball $m$ when the tire is to be pumped up. Now the pump is attached to the narrow portion of the part $e$ and the tire pumped up. The air passes through the narrow bore $e^1$, the fine opening in the washer $n$, the wider bore or space $k^2$ which houses the spring, the narrow bore $k^1$, the space $k$, the hollow screw $d$ and enters the pneumatic tube through the fine opening $d^2$ of the screw head $d^1$. When the tube is pumped up the screw head $d^1$ presses against the flexible washer $i$ and the flange $g$ rests on the inner surface of the pneumatic tire. This flange is sufficiently large for valve openings of various sizes. The flange $h$ which is somewhat larger than the flange $g$, rests on the outer surface of the pneumatic tire and presses with its small inner rim $h^2$ against the flexible washer $j$ located in the flange $c^1$ of the part $c$. Thus the tire is firmly held between the flanges $g$ and $h$ but lateral movement might be possible if the valve opening is rather large. Therefore the flange $h$ is provided with end points $h^1$ which are forced into the wooden rim $r$ as the tire is pumped up and thus lateral movement is prevented. When the air exerts pressure from inside the tire, the flexible washer $n$ is tightly pressed against the interior shoulder of the part $e$ and the ball $m$ is pressed against the washer by the spring $l$. Now the cap $f$ is again screwed on the part $e$. If by continued use it appears desirable to pump some more air into the tire, it will be found that the ball $m$ sticks fast to the washer $n$. To loosen the ball the point $f^1$ of the cap $f$ is forced through the bore $e^1$ so that the pressure of the pump can force the ball up during pumping.

It is plainly seen from the above that there are no threaded parts in the present air-tight valve which have a chance to communicate with the atmosphere, the threads being all inside. Leakage from the interior of the tire along the screw threads is therefore entirely prevented and an absolutely air-tight valve produced.

In Fig. 3 of the drawing a similar valve is illustrated which is preferably used in connection with valve openings that are not enlarged and have no cracks. The flanges $g$ and $h$ are dispensed with for economical reasons but preferably a double washer $j^1$ is used between the screw $d$ and the flange $c^1$ of the part $c$. Otherwise the construction of the valve is the same as described in connection with Fig. 2, all the threads are within the device and tightened like those shown in Fig. 2, and there is no possible chance of any threaded part to establish communication between the interior of the tire and the atmosphere. The part $c$ as shown in Fig. 5 is not strictly circular for the purpose of enabling the user to grip it firmly when it is tightened on the screw $d$.

I claim as my invention:

1. An air-tight valve for pneumatic tires comprising an interiorly threaded tubular part with end flange, a hollow screw with flat head engaging the threaded portion of said part, an inner flange loosely on the screw, a washer between the screw head and said flange, an outer flange loosely on said screw having an inner rim, a washer around the screw between said rim and the end flange of the tubular part, and means for closing the opposite end of the bore of the latter.

2. A valve for pneumatic tires comprising a tubular part having an interiorly threaded end portion and an end flange, a hollow screw with flat-head resting within the pneumatic tire when the valve is applied and engaging the threaded portion of the tubular part, an inner flange resting against the flat head of the screw, a washer between the screw head and said flange, an outer flange loosely on said screw having an inner rim and two outward end points adapted to be forced into the wooden wheel rim when the tire is pumped up, a washer around the screw between the said rim and the end flange of the tubular part, and means for closing the opposite bore of the latter.

Signed at New York, N. Y., this 2nd day of December, 1910.

MORRIS LEVRANT.

Witnesses:
LAWRENCE L. LEVY,
CORINNE MYERS.